Feb. 3, 1959     D. A. THORP ET AL     2,872,563
NOZZLE SECURING MEANS
Filed Nov. 8, 1957
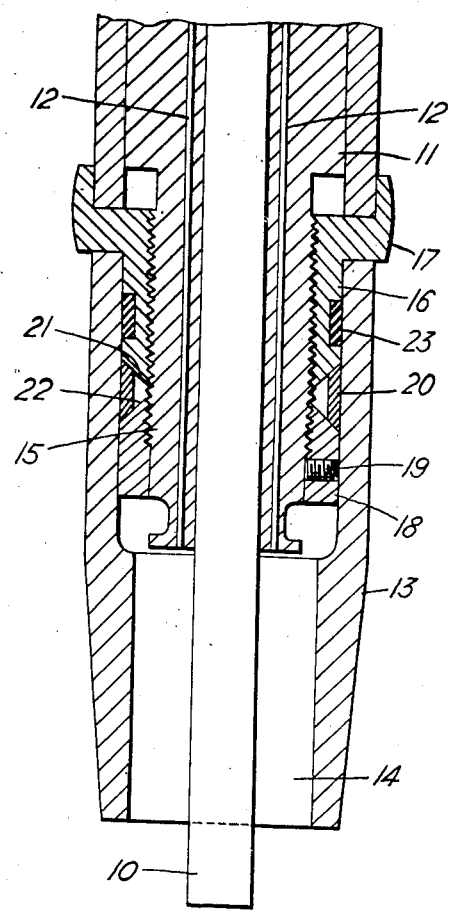
Inventor
DENNIS ALBERT THORP
ALFRED EDWARD USHER
By
Aaron R. Townshend Attorney

2,872,563

NOZZLE SECURING MEANS

Dennis Albert Thorp and Alfred Edward Usher, Middlesex, England, assignors to The British Oxygen Company Limited, a British company Application November 8, 1957, Serial No. 695,414

Claims priority, application Great Britain November 14, 1956

6 Claims. (Cl. 219—75)

This invention relates to means for securing a nozzle to a gas shielded arc welding torch.

Such torches are normally provided with a separable nozzle surrounding the end of the electrode and defining with the electrode an annular space through which the shielding gas is passed to the arc zone. Owing to their proximity to the arc when in use, such nozzles must be made of heat-resistant material and the material usually used is a non-metallic material, for example a ceramic material.

Heretofore such nozzles have been secured to the torch body by cutting a screw thread on the inner surface of the nozzle and screwing the nozzle on to a corresponding thread on the body portion. While it is, of course, simple to cut the necessary thread on a metal nozzle, the cutting of screw threads on ceramic and like non-metallic materials is a costly procedure and the threads tend to be inaccurate.

It is an object of the present invention to provide means for securing a nozzle to a gas shielded arc welding torch which does not necessitate the formation of a screw thread on the nozzle.

It is a further object to provide such means by the use of which the nozzle may be rapidly and simply secured in place and released. According to the present invention the nozzle is retained on the torch body by a radially expansible gripping member which is mounted on the torch body and is actuated by an operating member, also mounted on the torch body, so as to exert a gripping force on the internal surface of the nozzle. The operating member may be movable longitudinally along the torch body to actuate the gripping member, and in this connection said operating member may be rotatable internally screw threaded collar, the expansible member being located between one end of said collar and an abutment on the torch body.

Inclined faces on the collar and on the abutment may co-act with complementary faces on the gripping member to expand the latter.

An embodiment of the invention will now be described with reference to the accompanying drawing, which is a fragmentary sectional elevation showing the nozzle region of a gas shielded arc welding torch.

Referring to the drawing, the electrode 10 is supported by the torch body 11 which has longitudinal gas supply passages 12. The torch body 11 carries a tubular nozzle 13, which defines with the electrode 10 an annular space 14 through which shielding gas emerging from the passages 12 is passed to the arc zone.

The lower portion 15 of the torch body 11 is of reduced diameter, and is externally screw-threaded to receive a rotatable internally screw threaded collar 16. Such collar 16 is positioned at the upper end of the reduced diameter portion 15 of the torch body, and has an upper portion 17 of enlarged diameter which serves both as a shoulder against which the upper end of the nozzle 13 abuts to locate it upon the body, and as a means for rotating the collar 16.

A further internally screw-threaded collar 18 is screwed onto the bottom end of the threaded portion 15 of the torch body, and is fixed in position by a grub screw 19, so that the fixed collar 18 serves as an abutment. The space between the confronting ends of the two collars 16 and 18 houses an expansible gripping member 20, which is shown as being a collet although it may be of other form, e. g. a helical spring.

The collar 16 serves as an operating member for actuating the expansible collet 20, and in this connection the collar 16 has an inclined end face 21, the fixed collar 18 has an oppositely inclined end face 22, and the expansible collet 20 has co-acting inclined end faces in engagement with said faces 21 and 22, whereby the collet 20 is expanded by wedge action when the collar 16 is rotated to move it longitudinally along the torch body towards the abutment collar 18.

The nozzle 13 is slidable into its operative position upon the torch body, as a close fit over the abutment collar 18 and the adjustable collar or operating member 16, until it abuts against the shoulder 17 of the collar 16. The collar 16 is then rotated by means of the shoulder portion 17, which may be of hexagonal nut form for spanner operation or knurled for manual operation, so as to expand the collet 20 into frictional gripping engagement with the internal surface of the nozzle 13. Upward leakage of gas is prevented by an annular sealing ring 23 of rubber or the like, which is mounted in a groove in the collar 16 and cooperates with the inner surface of the nozzle 13.

The nozzle 13 can be rapidly and easily removed by reverse rotation of the collar 16, which allows the collet 20 to contract and release the nozzle.

Whilst the securing means of the present invention is of particular importance in the case of nozzles of ceramic or other non-metallic material, since it eliminates the need for cutting screw threads on the nozzle, it may also be used for metal nozzles for which it still has the advantage that the securing of the nozzle to and its release from the torch are rapidly and simply effected by merely rotating the movable collar.

The gas shielded arc welding torch may be adapted for use with either a non-consumable electrode, for example of tungsten, or with a continuous, consumable wire electrode.

What we claim is:

1. In a torch assembly for gas shielded arc welding, the combination of a torch body, a radially expansible gripping member mounted on said body, a nozzle member having a plain bore encircling said gripping member, and an operating member mounted on the body for movement thereon to expand the gripping member into frictional engagement with the nozzle.

2. In a torch assembly for gas shielded arc welding, the combination of a torch body, a radially expansible gripping member mounted on said body, a nozzle member having a plain bore encircling said gripping member, an operating member, means mounting said operating member for adjusting movement longitudinally of the body to expand the gripping member into frictional engagement with said nozzle.

3. In a torch assembly for gas shielded arc welding, the combination of a torch body, a screwthreaded portion on said body, a rotatable internally screwthreaded collar engaged with said screwthreaded portion of the body for adjustment along the latter, an abutment on said body, an expansible gripping member mounted on said body between the collar and the abutment so as to be expanded when the collar is moved towards the abutment, and a nozzle member having a plain bore encircling said gripping member, whereby the nozzle is frictionally secured to the body by expansion of the gripping member.

4. In a torch assembly for gas shielded arc welding, the combination of a torch body, a screwthreaded portion on said body, a rotatable internally screwthreaded collar engaged with said screwthreaded portion of the body for adjustment along the latter, an abutment on said body, an expansible gripping member mounted on said body between the collar and the abutment, said collar, the gripping member and the abutment having respective inclined faces which co-act to convert longitudinal adjustment of the collar along the body into radial expansion of the gripping member and a nozzle having a plain bore encircling the gripping member, whereby the nozzle is frictionally secured to the body by expansion of the gripping member.

5. A torch assembly according to claim 4, wherein the collar is provided with a portion of enlarged diameter which serves as a shoulder against which one end of the nozzle abuts to locate it upon the torch body.

6. A torch assembly according to claim 4, wherein the collar is provided with an annular sealing ring which cooperates with the bore of the nozzle to prevent leakage of gas.

References Cited in the file of this patent

UNITED STATES PATENTS

| | | |
|---|---|---|
| 2,512,705 | Anderson | June 27, 1950 |
| 2,512,706 | Anderson | June 27, 1950 |
| 2,656,797 | Anderson | Nov. 17, 1953 |